United States Patent [19]

Morgan et al.

[11] Patent Number: 4,467,168
[45] Date of Patent: Aug. 21, 1984

[54] METHOD OF CUTTING GLASS WITH A LASER AND AN ARTICLE MADE THEREWITH

[75] Inventors: George M. Morgan; Dale R. Hinkens, both of Fairfield, Iowa

[73] Assignee: Creative Glassworks International, Fairfield, Iowa

[21] Appl. No.: 249,854

[22] Filed: Apr. 1, 1981

[51] Int. Cl.³ ............................................. B23K 27/00
[52] U.S. Cl. ............................... 219/121 LG; 65/105; 219/121 LN
[58] Field of Search ................. 219/121 LG, 121 LN, 219/121 L, 121 LM; 65/105, 112

[56] References Cited

U.S. PATENT DOCUMENTS 3,930,825  1/1976  Chui ......................................... 65/97

Primary Examiner—C. L. Albritton
Attorney, Agent, or Firm—Bell, Seltzer, Park & Gibson

[57] ABSTRACT

A method of cutting glass with a laser. The glass is superposed a suitable support and a laser beam is directed onto the glass. The laser beam is focused to a point disposed at or about the surface of the glass. The focused laser beam vaporizes a first thickness of glass, less than the entire thickness, and simultaneously heats the remaining thickness above the annealing temperature of the glass. A jet of gas incident upon the laser focal point removes the heated and vaporized glass proximate the focal point to create a hole through the glass. By effecting movement between the glass and the laser and gas jet at a predetermined rate, the glass is cut. Also disclosed is an article including a unitary first sheet of glass having at least one complimental opening of predetermined configuration that does not extend to the edge of the glass and is cut by a laser. One or more complimentary glass inserts coplanar with the first glass are disposed within the opening of the first glass, defining a groove therebetween. A securing means is disposed in the groove to secure the complimentary pieces of glass in fixed edge to edge relationship.

20 Claims, 5 Drawing Figures

METHOD OF CUTTING GLASS WITH A LASER AND AN ARTICLE MADE THEREWITH

BACKGROUND OF THE INVENTION

This invention relates to the cutting of glass with a laser beam focused upon the glass to be cut, and items made of glass cut with a laser beam.

Glass and other crystalline materials, such as ceramics, are extremely fragile and difficult to work with due to the inherent characteristics of their crystalline structure. One of the more common problems encountered is cutting or shaping the material into pieces having predetermined shapes and sizes, especially shapes with non-linear edges, inside corners, and accurate reproductions of a given shape. Historically, glass was broken by scribing it on the surface along a line with a diamond-tipped scribe or diamond-tipped saw. This weakened the crystalline structure and, hopefully, the glass would break along the scribe line when an appropriate pressure was exerted to create a force at the scribe line. These breaks extended from edge to edge because it is extremely difficult, almost impossible, to control the length of a break or fracture or to terminate it at a predetermined location. In addition, impurities and discontinuities in the crystalline structure, as well as impacts or uneven pressure distribution, caused unwanted breaks, cracks, or deviations in the desired cut. And, once the glass was broken, it was beyond repair. The scribe and break technique also suffers the drawbacks of contamination of the glass from handling or coolant, excessive mechanical strain on the glass, high tooling forces, unpredictable fracturing, and dangerously sharp edges. Thus, the scribing and breaking of glass is fraught with uncertainty, is time consuming, requires a great amount of skill to avoid undue waste of material, and is labor intensive.

A still further drawback to the scribing and breaking technique that is of at least equal severity is the limitation to making linear edge to edge cuts. It is very difficult and time consuming to make "inside" corners or curved cuts. In order to make an inside corner or curved cut, one typically scribes the desired break line and then cross-hatches the surface of the glass to be removed with a matrix of closely spaced additional scribe lines. The cross-hatched glass is then carefully removed in very small pieces with a pliers-like "nipper". While this process may work with larger pieces of glass, it is extremely difficult with smaller ones or where the remaining glass forms a finger-like protrusion having little lateral support. Unfortunately, this method suffers all of the uncertainties aforenoted for scribing and breaking, and it also results in still higher failure rates and more waste of material, as well as producing an extremely ragged edge along the cut. As a result, intricate shapes can be made from a single piece of glass only with extreme difficulty, patience, and skill. A still further major drawback to the edge to edge limitation of cuts is that it prevents one from removing a portion of the glass from the interior of a sheet with an unbroken support piece or background piece remaining.

In an attempt to overcome these limitations, others have utilized lasers to scribe glass, thereby eliminating the costly diamond-tipped tools which suffer high wear rates due to the hardness of the glass or ceramic. The high power density and small focused spot of a laser beam offers many advantages for scribing and then breaking glass. Lasers often scribe at a higher rate than conventional tools and provide a very narrow uniform scribe line, which minimizes loss of material. Scribe lines as narrow as 0.1 mm. or less are typical. The high speed, narrow scribe line combination results in a narrow heat affected zone which may also be limited to a width on the order of 0.1 mm. if desired. The positioning accuracy of the scribe line is as good as that of the positioning mechanism, and maintenance of this accuracy is augmented by the almost non-existent tooling forces exerted by a laser. The glass is subjected only to the forces of the positioning mechanism for the glass. In addition, changes or alterations in the cutting pattern may be effected with a simple change in the positioning mechanism, or if the position of the glass or the laser beam is numerically controlled, a change in the controlling program. Such changes may affect the glass position and velocity, laser beam power output, laser beam wave output, width of the scribe line, etc. As an alternative to line scribing, one may drill a series of closely spaced holes that generally extend vertically downward through the material. However, neither scribing nor drilling cuts all of the way through the material or removes all of the material along a given path, and one must snap or break the material along the scribe line or drill line. Thus, since the material is not cut through, scribing is limited to straight line separations. It is not preferred for configurations with inside corners, curves or complex shapes, because the crystalline structure of the glass will probably result in a straight edge to edge break, regardless of the position or location of the scribe line.

In another attempt to overcome the numerous limitations of scribing by either tool or laser, others have utilized lasers to break glass by "controlled" fracturing. Brittle or crystalline materials such as glass may be cut by using a laser to rapidly heat the material in a small zone. This heating produces a mechanical stress which results in localized fracturing. If the fracture can be controlled, this technique may be used to cut glass by moving the glass with respect to the laser beam. Although in theory the fracture follows the beam path, suggesting that one may make such a fracture along any desired path, actual practice has shown that good control of the fracture has been obtained only at low speeds along a straight or a gently curving path. Higher speeds, as well as sharp curves or corners, have resulted in fractures which propagate without control. It has been reported that controlled fracturing has not been adopted in large scale operations.

Prior to applicants' invention, attempts to cut glass with a laser have been unsuccessful due to the intrinsic stress and fracture characteristics of the glass when it is subjected to intense localized heat. As a rule, glass cracks when heated non-uniformly. Accordingly, when glass is heated by an incident focused laser beam, the severe thermal stress can uncontrollably crack the glass. One proposed solution involving cutting glass with a laser wherein the glass was preheated to its annealing temperature (typically 950°–1100° F.), whereby cracking could not be sustained. This process required a specially designed furnace for heating the glass, including appropriate supports for the hot glass, and a separate furnace to slowly and uniformly cool the glass after cutting. This process involved vaporization of the entire glass thickness, which refers to decomposition of the glass rather than the usual meaning of phase change from a liquid or solid to a gas. The drawbacks of this process include a change of the color of the glass, a change in transparency in a region on each side of the cut, creation of a zone of gas bubbles trapped within the glass on each side of the cut, and an uncut transient section at the beginning of the laser path. Still further drawbacks include a high power requirement, not only for operation of the laser to achieve total vaporization, but also for preheating the glass and controlling the rate of cooling after the cut is made.

SUMMARY OF THE INVENTION

Thus, it is an object of the present invention to provide an improved method of cutting glass with a laser beam in order to overcome the problems associated with prior methods of cutting glass.

It is a further object of the present invention to provide a method of cutting glass with a laser beam, which method is efficient in operation, and operates consistently and uniformly.

It is a further object of the present invention to provide a method of cutting glass into desired shapes and configurations with a laser beam.

It is a further object of the present invention to provide a method of cutting glass with a laser beam at room temperature that does not require preheating of the glass, yet eliminates the problem of undesireable crack propagation.

It is a further object of the present invention to significantly reduce the time necessary to cut glass.

It is a further object of the present invention to cut shapes from glass that have heretofore been considered nearly impossible or, at best, excessively time consuming and possible only on a trial and error basis.

It is a further object of the present invention to take and mix linear and non-linear cuts in glass.

It is a further object of the present invention to cut glass having a variety of compositions, thicknesses, colors and textures.

It is a further object of the present invention to cut an intricate unbroken shape or shapes out of a sheet of glass and still maintain an unbroken background piece.

It is a further object of the present invention to repeatedly cut exact and accurate shapes of glass in small or large quantities.

It is a further object of the present invention to make a cut or cut a shape within an unbroken sheet of glass wherein the cut does not join back upon itself or extend to the edge of the sheet of glass.

It is a further object of the present invention to provide a method of obtaining a unitary sheet of glass having an opening therein of predetermined configuration, the opening cut therein by a laser and not extending to the edge of the sheet of glass.

It is a further object of the present invention to remove an interior portion from a sheet of glass and replace it with one or more shapes accurately sized to fit in said interior opening for possible edge to edge adhesion.

It is a further object of the present invention to cut glass and simultaneously achieve a smooth edge, similar to a fire polished edge.

Further and additional objects will appear from the description, accompanying drawings and appended claims.

In accordance with one embodiment of the present invention, a method of cutting glass with a laser beam is disclosed. A laser with a predetermined energy output and waveform is provided for directing a laser beam onto glass that is superposed a support means. The laser beam is focused to a predetermined configuration and the focal point is disposed at or about the surface of the glass. When energized, the laser beam, proximate the focal point, vaporizes a portion of the glass thickness and heats the remaining thickness above its annealing temperature. A jet of gas is directed at the laser beam focal point and removes the vaporized and heated glass. Movement is effected between the glass and the laser beam and gas jet at predetermined rates, maintaining the laser focal point at or about the surface of the glass, to define a cut through the entire glass thickness.

The invention also includes articles of manufacture made of a sheet of glass having a cut of predetermined configuration made by a laser.

DESCRIPTION OF THE DRAWINGS

For a more complete understanding of the invention, reference should be made to the drawings wherein.

DESCRIPTION

Figure 1:
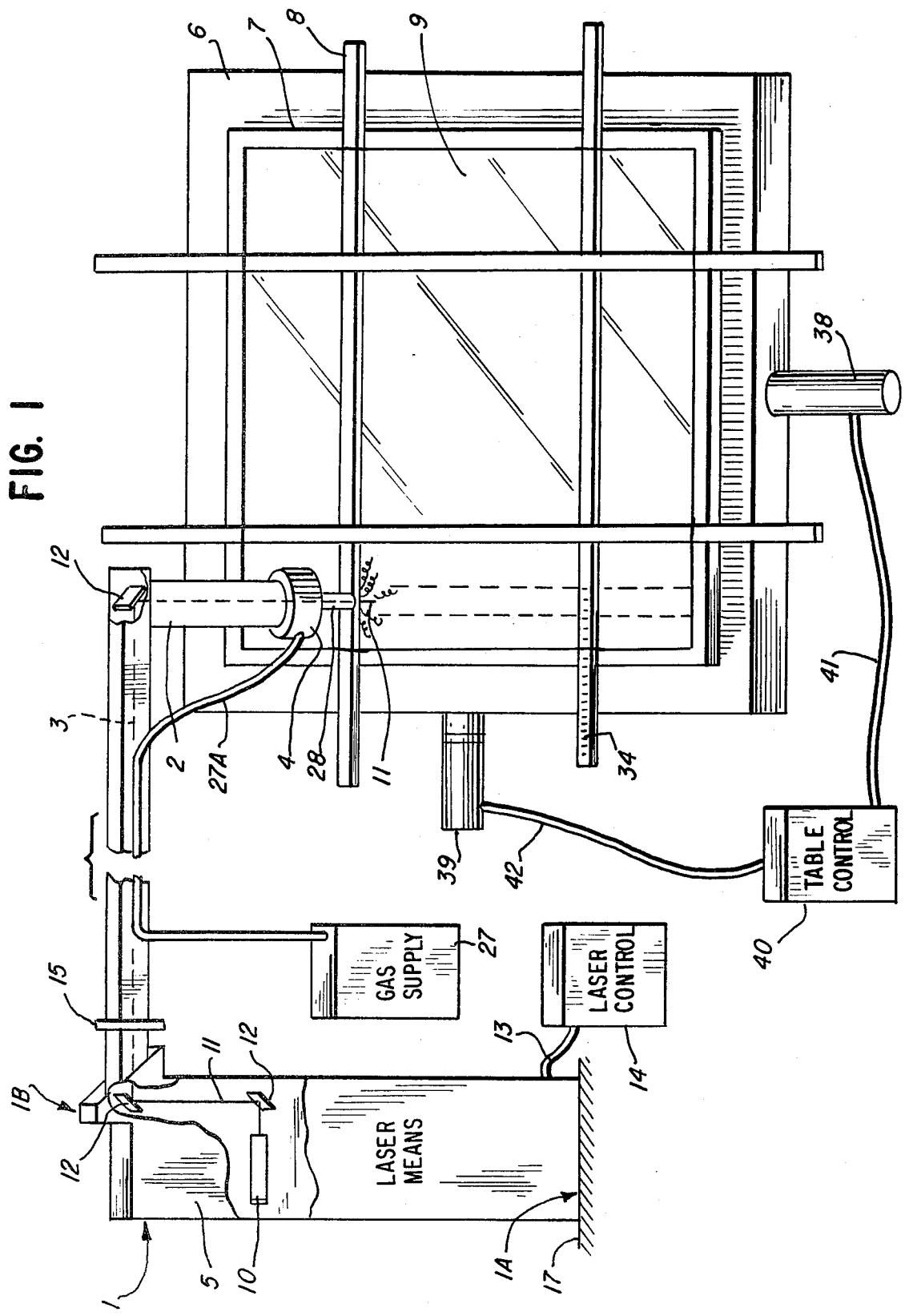
FIG. 1 is an elevated schematic illustration showing a laser and gas jet, including a laser control means and a gas supply, and a table with a moveable top, including table control means, supporting a sheet of glass.

Referring now to the drawings, FIG. 1 illustrates generally the apparatus used to practice the present invention. A laser means 1 is optically and mechanically connected to a focusing head 2 by a traverse casing 3. The focusing head includes a collar 4 that forms a nozzle or gas jet. The focusing head 2 and gas jet assembly is superposed a table 6 having a moveable platen 7. The platen has attached thereto a predetermined number of arms 8 that support a sheet of glass 9 above the platen 7. The platen, with the attached arms 8 and supported sheet of glass 9, is moved in two dimensions (i.e. within the plane of the glass) so that the laser beam traces a predetermined path, thereby cutting the glass. Further details of the invention and apparatus used are disclosed in subsequent paragraphs herein.

The laser means 1 includes a housing 5 that encases and suitably supports a laser source 10, including all of the elements to generate a laser beam 11 when the source 10 is suitably energized. The direction of beam propagation may be altered and controlled as desired with suitable mirrors 12. A control cable 13 connects the laser source to a laser control means 14. The laser control means energizes, alters, and otherwise controls the laser beam output of the laser source 10. This control may govern, among other things, the power output of the laser, usually measured in watts, and the waveform or duty cycle of the laser beam by varying it between continuous and intermittent operation. In addition, a mechanical shutter 15 may be interposed in the path of the laser beam 11 to provide additional beam control and for safety reasons. The detailed operation of the laser source 10 and its control means 14 is not a part of nor necessary for an understanding of the present invention, beyond the information disclosed herein. In addition, a variety of lasers, within the parameters disclosed herein, may be compatible for cutting glass, including but not limited to gas lasers, such as ones having a mixture of carbon dioxide, nitrogen, and helium.

The laser means 1 is rigidly attached to a solid ground or other base of support 17 at its lower end 1A. The upper portion 1B is typically attached to a hollow traverse casing 3 that supports the focusing head 2 by suspending it over the sheet of glass 9. The configuration of the traverse casing 3 and support 17 can be varied or added to as necessary or desireable, provided that they maintain the focusing head 2 in a predetermined position and isolate it from vibrations or other insults which might result in unwanted movement of the laser beam 11. As illustrated, the traverse casing 3 may also support or guide any gas lines.

Figure 2:
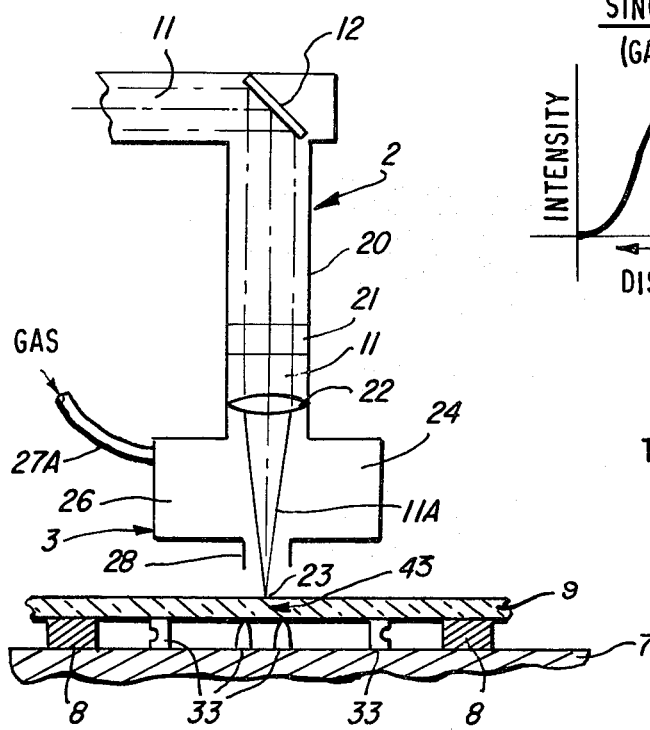
FIG. 2 is a cross-sectional side view schematic illustration showing a laser for cutting glass, including a gas jet, superposed a sheet of glass supported by a table.

Referring now to FIGS. 1 and 2, one or more mirrors 12 are disposed in the laser means 1 and traverse casing 3 at desired locations and at appropriate angles to deflect the laser beam 11 into the focusing head 2. The focusing head 2 includes a housing 20 depending from or attached to the traverse casing 3. The housing 20 is generally opaque, except for an optional exit window 21, and may be made of metal, plastic, or the like. It is desireable to have the housing 20 sealed shut to eliminate the intrusion of non-transparent impurities, including dust and the like, and for safety reasons, to prevent unwanted emissions of laser energy.

An exit window 21, which may or may not be present, but which is transparent to the laser beam if it is present, is disposed and removably secured within the housing 20 to provide a sealed and clean path for the laser beam 11. The exit window preferably has a high efficiency ratio in transferring the laser energy and is of very good optical quality. Downstream of the optional exit window 21 is a focusing lens 22 which is also disposed and removably secured within the housing 20. The focusing lens converges the laser beam to a focal point 23. As with the exit window, the focusing lens 22 should have a high efficiency ratio and be of very good optical quality so that energy losses, beam divergance, and other optical aberrations are minimized. As a matter of convenience and optimum operation, this lens may be changed to vary the focal length and beam power to create a focal point having the necessary or desireable energy density. Lenses of 5 inches and 3¾ inches focal length with a diameter of approximately 1½ inches have been found satisfactory when used with a laser having a power output in excess of approximately 600 to 700 watts. This combination results in a laser beam focal point having sufficient energy to vaporize and heat glass in accordance with the present invention. (Vaporization refers to decomposition of the glass rather than to the traditional phase change from a solid or liquid to a gas.)

A collar 4 may be attached to the housing 20, or may be an integral part thereof, and forms a generally gas tight cavity 26 that is connected to a pressurized supply of gas 27 by a suitable line 27A. The collar 4 also defines a nozzle 28 that is generally concentric with the axis of the laser beam and may be an integral part of the housing. The nozzle directs a jet of pressurized gas at the focal point 23 of the laser beam. The gas may be atmospheric air or otherwise, provided it is transparent to the laser beam. The volume, pressure, and flow rate of the gas may be monitored and controlled by conventional means.

Still referring to FIGS. 1 and 2, a sheet of glass 9, shown in a cross-sectional view in FIG. 2, is positioned beneath the laser means 1, with the focused laser beam 11A incident thereon and generally perpendicular thereto. The sheet of glass is supported above the platen 7 about one inch or more by a predetermined number of arms 8 and other supports 33. An aluminum platen has been found satisfactory because it has high thermal conductivity characteristics and is therefore relatively insensitive to localized heating. This minimizes heat distortion. The arms 8 may be of any desired length or dimension, provided they supply adequate support to the sheet of glass. Rectangular aluminum bars one by one/half inch have been found satisfactory, and may include a predetermined number of vertically drilled and conveniently spaced holes 34 (not shown in all arms) to aid in securing or positioning the glass sheet 9. Auxiliary supports 33 are recommended to insure adequate support along a proposed cutting path and to insure that the sheet of glass remains as nearly flat as possible. Upwardly protruding rods with flat or pointed ends or short sections of channel shaped material have been found satisfactory. As would be apparent to a skilled artisan, the specific configuration of the supports, the material they are made of, and their position on the platen may be altered as necessary or desireable.

The moveable platen 7 is attached to a table 6, such as a machining table or the like, and the platen may be moved along X-Y coordinates in a plane parallel to the plane of the sheet of glass 9. There are a variety of suitable tables available and well known. They are typically operated by a pair of electric motors 38, 39, or the like, that are connected to a suitable screw mechanism or scissor mechanism (not shown) to move the platen. The motors are connected to a table control means 40 by suitable control cables 41 and 42 that energize the motors in the proper sequence and at the proper time and rate to effect the desired platen motion. The table control means may be digital or analog and responsive to any variety of inputs well known in the art. This type of table and control mechanism are typical of those used for machining metal. They provide accurate and repeatable motion for both curved and linear motion at preselected rates of movement.

Although the preferred embodiment discloses a laser means 1 that is stationary and a sheet of glass that is moved by the controllable table platen 7, this may be reversed as desireable. For instance, with heavier sheets of glass, awkwardly sized sheets, or non-planar glass, it may be desireable to move the focusing head 2 while the glass remains stationary. In addition, a table or other apparatus that moves in three dimensions, or has a rotational axis like a lathe, may be used to cut irregularly shaped or tubular glass objects.

When practicing the invention, the table control means 40 is programmed in a conventional manner to move the sheet of glass in a predetermined direction at a predetermined rate. If the table is numerically or digitally controlled, designs may be digitized, for instance on a digitizer or graphics tablet, such as one manufactured by Talos Systems Inc., Computervision Inc., or the like, and interfaced with the table control 40 in any conventional manner. When so programmed, the table moves the sheet of glass beneath the focusing head 2.

The sheet of glass 9 is placed onto the platen 7, supported by arms 8 and any necessary or desireable other supports 33. The supports 33 are generally positioned on opposite sides of the proposed cut at a distance of $\frac{1}{8}$ to $\frac{1}{2}$ inch from the cut, and the arms 8 preferably extend at least to the edge of the sheet 9.

The focusing head 2 is positioned above the sheet of glass 9 so that the laser beam is generally vertical with respect to the plane of the sheet. The vertical distance above the sheet is adjusted so that the focal point 23 is disposed at or about the surface of the glass. The distance from the tip of the air jet nozzle to the glass is generally less than an inch, and usually in the range of one-eighth to one-fourth of an inch. However, this distance may vary according to the type of nozzle used and the desired characteristics of the gas jet.

Figure 3:
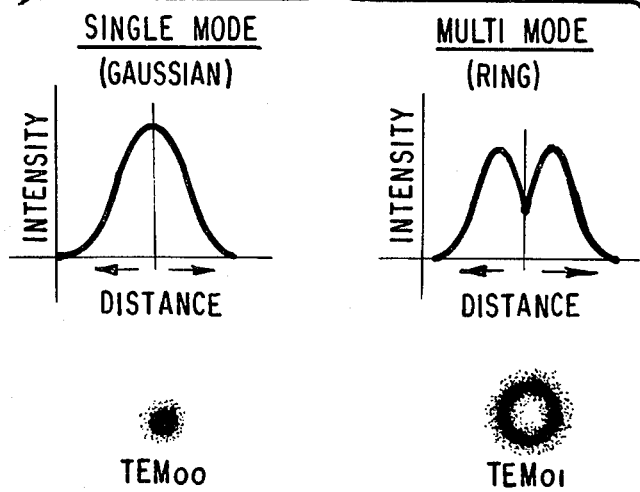
FIG. 3 is an illustration and graph showing the relative intensity and appearance of a laser beam for single mode and multi-mode lasers, with respect to a plane perpendicular to the beam axis.

To cut the glass, the laser means 1 and gas jet 28 are energized. Referring to FIG. 3, most lasers produce a $TEM_{01}$ or multi-mode standing wave double peaked beam intensity that focuses to a ring profile. This energy distribution is the sum of all of the standing waves created by the laser and is a function of the dimensions of the laser cavity and laser mirrors. The most fundamental beam intensity is a $TEM_{00}$ mode that focuses to a dot and is commonly referred to as a "gaussion mode". This mode has a more dense energy distribution, but it is difficult and costly to obtain. A multi-mode laser provides a sufficiently dense energy distribution for the present invention to cut glass one-eighth of an inch thick when the laser means 1 is energized to produce a beam 11 having a power output of about 1.2 kilowatts. It has been determined that the energy output may be varied, but energy levels below approximately 600 to 700 watts should be avoided for cutting according to the present invention. These lower power settings result in undesireable cracking, incomplete cutting, and ragged edges.

The laser beam causes rapid localized heating of the glass in a small vertical heat affected zone 43 (see FIG. 2) that extends through the entire thickness of the glass and is proximate the laser focal point 23. For a sheet of glass approximately $\frac{1}{8}$ inch thick, approximately the top five to thirty percent of the glass adjacent the laser focal point is vaporized. The remaining portion of the zone 43 is heated by the focused beam above its annealing range (approximately 950°–1100° F.), at which temperature the glass becomes viscous. The air in the cavity 26, pressurized to about 60 to 100 p.s.i., moves out the nozzle 28, displaces the vaporized and molten glass from the heat affected zone 43, and carries it below the glass 9 where it is usually deposited on the platen 7. The space between the glass 9 and the platen 7 allows the air to escape. By moving the sheet of glass with respect to the laser at a rate of about 30 to 70 inches per minute, the glass is cut entirely through. Due to the quantum-mechanical nature of the laser beam, only the small cross-section of glass in the heat affected zone 43 is exposed to the high temperature differential, and experiments have demonstrated that the glass, at room temperature, does not crack. Rather, it is cleanly cut with smooth edges, similar to a fire polished edge, producing a kerf of uniform width. Since the glass is cut at room temperature, both the top and bottom surfaces remain smooth and flat, regardless of cut speed. No drooping occurs as in heated specimens.

Figure 4:
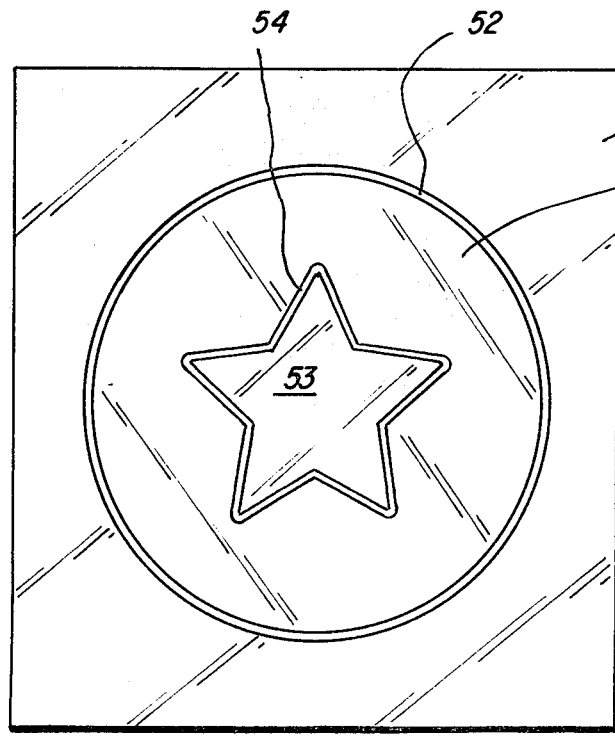
FIG 4 is a top plan view of an article of manufacture made of a sheet of glass having several cuts made by a laser. Each cut is within the sheet of glass without extending to an edge thereof. A second piece of glass is disposed within an opening in the first sheet and coplanar therewith, secured to the first sheet in edge to edge relation; and, a third piece of glass is disposed within an opening in the second sheet and coplanar therewith, secured to the second sheet in edge to edge relation.
Figure 5:
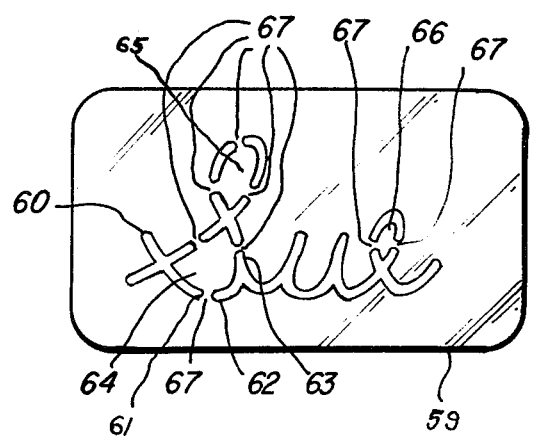
FIG. 5 is a top plan view of an article of manufacture made of a sheet of glass having several cuts made by a laser. Each cut is within the sheet of glass without extending to an edge thereof.

Any variety of shapes, contours, and cuts may be made using the foregoing techniques. FIGS. 4 and 5 are illustrative. In FIG. 4, a single unitary background sheet of glass 50 was cut to remove an inner circular shape 51, creating a kerf 52. From the inner circular shape a star shape 53 was cut, creating a kerf 54. All three pieces are unbroken and may be lifted out, and the kerfs 52, 54 have smooth edges. Also, none of the cuts extend to the edge of their respective background pieces.

These pieces of glass may be used individually, or complimentary shaped pieces of glass cut by the same method and by the same or a similar program for the machine table may be inserted into the corresponding openings. For instance, one or more pieces of glass having a composite shape complimentary to one of the openings but having a different color or texture may be placed coplanar to the background piece 50 and secured in edge to edge relation therewith. The edges of the glass are cleaned by scraping, as with the blade of a putty knife, to remove any refused silica, and the glass shapes are reassembled into their desired final configuration. The reassembled pieces of glass may be secured with the traditional copper foil, solder, or lead, or an adhesive, such as one that is a clear, colorless liquid photopolymer consisting of 100% solids. Adhesives such as those manufactured by Norland Products, Inc., Epoxy Technology Incorporated, or Tra-Con, Inc. have been found satisfactory. Due to the precision cutting of the laser process, the various interchange pieces fit together precisely to create a kerf of uniform width, facilitating the edge to edge securing of the pieces of glass. The uncut unitary background sheet provides structural support for the entire assembly, permitting the assembly to be used as a room divider or the like.

As illustrated in FIG. 5, one may also utilize a series of cuts that start and stop within the sheet of glass but do not close upon themselves. As illustrated, one may script write on a sheet of glass 59 with a cut beginning at, for instance, 60, ending at 61; resuming at 62, ending at 63; and so on until the desired design is obtained. The interior portions 64, 65 and 66 created by such laser cutting are supported by webs 67. The cut is clean, with smooth edges, and no debris attaches on the bottom side of the cut. Alternatively, one may make an uninterrupted cut, remove the interior portions 64, 65 and 66, and replace them with other glass, mirrors or the like. The sheet of glass 59 may be cut to any desired shape. Thus, it is readily apparent that one having the benefit of the foregoing may design decorative and functional items of any shade, color or texture of glass.

In addition to the cutting process disclosed herein, one may etch glass in a similar manner according to a predetermined pattern by reducing the average power output of the laser beam. To etch a sheet of double pane glass, the power output should be reduced to approximately 40 watts average power. This reduction in power may be accomplished, for example, by energizing a laser to provide a pulsed output or reduced duty cycle. With a feedrate of approximately 75 inches per minute and an air pressure of approximately 75 p.s.i., a continuous and readily visible etching or scribe line is created that penetrates approximately 2 to 5% into the depth of the glass. There is no damage to or cracking of the underlying glass.

The same techniques and methods disclosed herein are also suitable for cutting a variety of thicknesses of glass, and it is not limited to the thicknesses disclosed herein. It should be noted that the laser energy settings and glass feedrates vary depending upon the type, thickness, color and composition of the glass; the mode output, energy capabilities and power factor of the laser means; the capabilities of the mechanical support table; and the shape of the cut. For instance a sheet of glass 0.128 inches thick may be cut in a circular or contouring shape with a 1.2 kilowatt continuous wave laser beam at speeds from 30 to 100 inches per minute. Speeds for straight cuts are somewhat higher. Thus, the values provided herein are exemplary only.

While particular embodiments and applications have been shown, it is understood that the invention is not limited thereto since modifications may be made by those skilled in the art, particularly in light of the foregoing teachings. For instance, while one object of the invention is to provide a unitary background sheet of glass with an opening therein that does not extend to the edge of the sheet, one may also repeatedly cut unbroken shapes that may be useful in industrial or commercial applications, regardless of the status of the background sheet. It is, therefore, contemplated that the appended claims cover any such modifications that incorporate those features which constitute the essential features of the present invention.

What is claimed is:

1. Method of cutting glass having a predetermined thickness with laser means having a laser beam output, said method comprising
    superposing the glass in predetermined spaced relationship with respect to a support means;
    directing laser means so that a laser beam generated thereby is incident upon said glass, said laser means having a predetermined energy output;
    focusing said laser beam to a focal point proximate the surface of said glass to locally heat said glass proximate said focal point;
    vaporizing a first thickness of said glass proximate said laser focal point, said first thickness being less than the total glass thickness;
    simultaneously with said vaporizing, heating the remaining thickness of said glass proximate said laser focal point, said remaining thickness being heated above its annealing temperature;
    directing a jet of gas so that it is incident upon the proximity of said laser focal point, said jet cooperating with said beam to remove said vaporized and said heated glass proximate said laser focal point to create a hole through said glass; and
    effecting movement between said glass and said laser focal point and gas jet along a predetermined path at a predetermined rate, maintaining said focal point at or about the surface of said glass during any movement, thereby defining a cut through the entire thickness of said glass.

2. A method of cutting glass as in claim 1 further comprising selectively controlling said laser means energy output.

3. An article of manufacture comprising glass having at least one cut of predetermined configuration and length, each cut having been made by
    superposing the glass in predetermined spaced relationship with respect to a support means;
    directing laser means so that a laser beam generated thereby is incident upon said glass, said laser means having a predetermined energy output;
    focusing said laser beam to a focal point proximate the surface of said glass to locally heat said glass proximate said focal point;
    vaporizing a first thickness of said glass proximate said laser focal point, said first thickness being less than the total glass thickness;
    simultaneously with said vaporizing, heating the remaining thickness of said glass proximate said laser focal point, said remaining thickness being heated above its annealing temperature;
    directing a jet of gas so that it is incident upon the proximity of said laser focal point, said jet cooperating with said beam to remove said vaporized and said heated glass proximate said laser focal point to create a hole through said glass; and
    effecting movement between said glass and said laser focal point and said gas jet along a predetermined path at a predetermined rate, maintaining said focal point at or about the surface of said glass during any movement, thereby defining a cut through the entire thickness of said glass.

4. An article as in claim 1 wherein said glass is a unitary sheet.

5. An article as in claim 3 or claim 4 wherein at least one cut is within the perimeter of said glass without extending to an edge thereof.

6. An article as in claim 3 or claim 4 wherein at least one cut begins at one location within the perimeter of said glass and terminates at a different location within the perimeter of said glass.

7. An article as in claim 3 or claim 4 wherein at least one cut begins and terminates at the same location within the perimeter of said glass, said cut defining at least one opening in said glass.

8. An article of manufacture comprising
    a first unitary sheet of glass defining at least one complimental opening of predetermined configuration that does not extend to the edge of said sheet of glass, said opening created by cutting said glass with laser means;
    at least one second sheet of glass coplanar with said first sheet and disposed within at least one of said complimental openings of said first sheet, said second sheet substantially complimentary to said opening in said first sheet, said opening of said first sheet and the periphery of said second sheet defining a groove therebetween; and
    securing means disposed substantially within said groove between said first sheet and said second sheet for securing in fixed edge to edge relationship said first sheet and said second sheet.

9. An article as in claim 8 wherein said second sheet of glass comprises a plurality of coplanar sheets of glass secured together in fixed edge to edge relationship.

10. An article as in claim 8 or claim 9 wherein said securing means comprises a photopolymer material.

11. An article as in claim 10 wherein said epoxy is curable by ultraviolet radiation.

12. An article as in claim 8 or claim 9 wherein said securing means is metallic.

13. The method of claim 1 wherein the step of directing laser means comprises orienting the laser beam to be substantially perpendicular to the glass.

14. The method of claim 1 wherein the step of directing laser means further comprises generating a laser beam having a multi-mode energy distribution.

15. The method of claim 1 wherein the step of directing laser means further comprises generating a laser beam having a single mode energy distribution.

16. The method of claim 1 wherein the step of vaporizing a first thickness of said glass comprises vaporizing approximately 5 to 30 percent of the total glass thickness.

17. The method of claim 1 wherein the step of directing a jet of gas comprises directing the jet of gas downwardly onto the glass.

18. The method of claim 1 wherein the step of directing a jet of gas comprises directing the jet of gas substantially parallel to and coincident with said laser beam.

19. The method of claim 1 wherein the step of effecting movement between said glass and said laser focal point and gas jet comprises moving said sheet of glass while the laser means and gas jet are stationary.

20. The method of claim 1 wherein said step of effecting movement between said glass and said laser focal point and gas jet comprises moving said laser means and gas jet while said sheet of glass is stationary.

* * * * *